United States Patent [19]
Gehlsen et al.

[11] Patent Number: 6,103,152
[45] Date of Patent: Aug. 15, 2000

[54] ARTICLES THAT INCLUDE A POLYMER FOAM AND METHOD FOR PREPARING SAME

[75] Inventors: Mark D. Gehlsen, Eagan; Bradley S. Momchilovich, Stillwater, both of Minn.

[73] Assignee: 3M Innovative Properties Co., St. Paul, Minn.

[21] Appl. No.: 09/127,774

[22] Filed: Jul. 31, 1998

[51] Int. Cl.[7] .................................................... B32B 3/26
[52] U.S. Cl. ................... 264/45.4; 264/45.9; 428/313.5; 428/317.3; 428/317.9
[58] Field of Search ............................ 428/317.9, 317.3, 428/304.4, 313.5; 264/45.4, 45.9

[56] References Cited

U.S. PATENT DOCUMENTS

| | | | |
|---|---|---|---|
| 2,866,722 | 12/1958 | Gensel et al. | 117/104 |
| 2,956,904 | 10/1960 | Hendricks | 117/93 |
| 3,565,247 | 2/1971 | Brochman | 206/59 |
| 3,615,972 | 10/1971 | Morehouse et al. | 156/79 |
| 3,864,181 | 2/1975 | Wolinski et al. | 156/79 |
| 3,932,328 | 1/1976 | Korpman | 260/27 BB |
| 4,223,067 | 9/1980 | Levens | 428/308 |
| 4,287,308 | 9/1981 | Nakayama et al. | 521/53 |
| 4,415,615 | 11/1983 | Esmay et al. | 428/40 |
| 4,610,923 | 9/1986 | Schrock . | |
| 4,618,525 | 10/1986 | Chamberlain et al. | 428/209 |
| 4,710,536 | 12/1987 | Klingen et al. | 524/493 |
| 4,749,590 | 6/1988 | Klingen et al. | 427/54.1 |
| 4,818,610 | 4/1989 | Zimmerman et al. | 428/345 |
| 4,855,170 | 8/1989 | Darvell et al. . | |
| 4,906,421 | 3/1990 | Plamthottam et al. | 264/22 |
| 4,921,739 | 5/1990 | Cascino | 428/40 |
| 4,950,537 | 8/1990 | Vesley et al. | 428/345 |
| 4,960,802 | 10/1990 | DiStefano | 521/72 |
| 5,024,880 | 6/1991 | Veasley et al. | 428/317.5 |
| 5,086,088 | 2/1992 | Kitano et al. | 522/170 |

(List continued on next page.)

FOREIGN PATENT DOCUMENTS

| | | | |
|---|---|---|---|
| 747341 | 11/1966 | Canada . | |
| 0 206 760 | 12/1986 | European Pat. Off. . | |
| 0 084 220 | 1/1987 | European Pat. Off. . | |
| 0 222 680 | 5/1987 | European Pat. Off. . | |
| 0 324 242 | 7/1989 | European Pat. Off. . | |
| 0 349 216 | 1/1990 | European Pat. Off. . | |
| 0 567 837 | 11/1993 | European Pat. Off. . | |
| 0 575 012 | 12/1993 | European Pat. Off. | C08J 9/32 |
| 0 710 696 | 5/1996 | European Pat. Off. . | |
| 0 717 091 | 6/1996 | European Pat. Off. . | |
| 0 763 585 | 9/1996 | European Pat. Off. . | |
| 195 27 926 A1 | 7/1995 | Germany | C09J 7/02 |
| 195 31 631 | 3/1997 | Germany | C08J 9/32 |
| 197 30 854 A1 | 1/1999 | Germany | C09J 7/02 |
| 60-76583 | 1/1985 | Japan . | |
| 5-194921 | 8/1993 | Japan . | |
| WO/93/07228 | 4/1993 | WIPO . | |
| WO/95/16754 | 6/1995 | WIPO . | |
| WO/95/25774 | 9/1995 | WIPO . | |
| WO/96/14366 | 5/1996 | WIPO . | |
| WO/96/38285 | 12/1996 | WIPO . | |
| WO 99/03943 | 1/1999 | WIPO | C09J 7/02 |

OTHER PUBLICATIONS

D. Klempner & Kurt C. Frisch, The Handbook of Polymeric Foams and Foam Technology, pp.229–233, Hanser Publishers (1991).
Abstract Japan 08067861, Mar. 12, 1996.
Cobbs, W., "Foaming of Hot Melts", pp. 103–115.

*Primary Examiner*—Deborah Jones
*Assistant Examiner*—Jason Savage
*Attorney, Agent, or Firm*—Harold C. Knecht, III

[57] ABSTRACT

Polymer foam articles having a substantially smooth surface prepared by melt-mixing a polymer composition and a plurality of microspheres, at least one of which is an expandable polymeric microsphere, under process conditions, including temperature and shear rate, selected to form an expandable extrudable composition; and extruding the composition through a die.

45 Claims, 6 Drawing Sheets

U.S. PATENT DOCUMENTS

| | | | |
|---|---|---|---|
| 5,100,275 | 3/1992 | Plamthottam et al. . | |
| 5,100,728 | 3/1992 | Plamthottam et al. | 428/345 |
| 5,115,103 | 5/1992 | Yamanishi et al. | 174/24 |
| 5,151,327 | 9/1992 | Nishiyama et al. | 428/343 |
| 5,234,757 | 8/1993 | Wong | 428/311.1 |
| 5,264,278 | 11/1993 | Mazurek et al. . | |
| 5,342,858 | 8/1994 | Litchholt et al. | 521/98 |
| 5,441,810 | 8/1995 | Aizawa et al. | 428/354 |
| 5,476,172 | 12/1995 | Hartman et al. | 428/317 |
| 5,476,712 | 12/1995 | Hartman et al. . | |
| 5,605,717 | 2/1997 | Simmons et al. | 427/208.2 |
| 5,609,954 | 3/1997 | Aizawa et al. | 428/317.5 |
| 5,695,837 | 12/1997 | Everaerts et al. . | |
| 5,780,523 | 7/1998 | Petit et al. . | |
| 5,783,272 | 7/1998 | Wong . | |

ARTICLES THAT INCLUDE A POLYMER FOAM AND METHOD FOR PREPARING SAME

BACKGROUND OF THE INVENTION

This invention relates to preparing articles that include a polymer foam.

Articles incorporating a polymer foam core are known. The foam includes a polymer matrix and is characterized by a density that is lower than the density of the polymer matrix itself. Density reduction is achieved in a number of ways, including through creation of gas-filled voids in the matrix (e.g., by means of a blowing agent) or inclusion of polymeric or non-polymeric microspheres (e.g., glass microspheres).

SUMMARY OF THE INVENTION

In a first aspect, the invention features an article that includes a polymer foam having a substantially smooth surface. The foam may be provided in a variety of shapes, including a rod, a cylinder, a sheet, etc. In some embodiments, e.g., where the foam is provided in the form of a sheet, the foam has a pair of major surfaces, one or both of which are substantially smooth. The foam includes a plurality of microspheres, at least one of which is an expandable polymeric microsphere.

As used herein, a "polymer foam" refers to an article that includes a polymer matrix in which the density of the article is less than the density of the polymer matrix alone.

A "substantially smooth" surface refers to a surface having an Ra value less than about 75 micrometers, as measured by laser triangulation profilometry according to the procedure described in the Examples, infra. Preferably, the surface has an Ra value less than about 50 micrometers, more preferably less than about 25 micrometers. The surface is also characterized by the substantial absence of visually observable macroscopic defects such as wrinkles, corrugations and creases. In addition, in the case of an adhesive surface, the surface is sufficiently smooth such that it exhibits adequate contact and, thereby, adhesion to a substrate of interest. The desired threshold level of adhesion will depend on the particular application for which the article is being used.

An "expandable polymeric microsphere" is a microsphere that includes a polymer shell and a core material in the form of a gas, liquid, or combination thereof, that expands upon heating. Expansion of the core material, in turn, causes the shell to expand, at least at the heating temperature. An expandable microsphere is one where the shell can be initially expanded or further expanded without breaking. Some microspheres may have polymer shells that only allow the core material to expand at or near the heating temperature.

The article may be an adhesive article or a non-adhesive article. An "adhesive article" is an article having a surface available for bonding that is either tacky at room temperature (i.e., pressure sensitive adhesive articles) or becomes tacky when heated (i.e., heat-activated adhesive articles). An example of an adhesive article is a foam that itself is an adhesive, or an article that includes one or more separate adhesive compositions bonded to the foam, e.g., in the form of a layer, in which case the foam itself need not be an adhesive. Examples of non-adhesive articles include non-adhesive foams and adhesive foams provided with a non-adhesive composition, e.g., in the form of a layer, substrate, etc., on all surfaces available for bonding.

The foam preferably is substantially free of urethane crosslinks and urea crosslinks, thus eliminating the need for isocyanates in the composition. An example of a preferred material for the polymer foam is an acrylic polymer or copolymer. In some cases, e.g., where high cohesive strength and/or high modulus is needed, the foam may be crosslinked.

The polymer foam preferably includes a plurality of expandable polymeric microspheres. The foam may also include one or more non-expandable microspheres, which may be polymeric or non-polymeric microspheres (e.g., glass microspheres).

Examples of preferred expandable polymeric microspheres include those in which the shell is essentially free of vinylidene chloride units. Preferred core materials are materials other than air that expand upon heating.

The foam may contain agents in addition to microspheres, the choice of which is dictated by the properties needed for the intended application of the article. Examples of suitable agents include those selected from the group consisting of tackifiers, plasticizers, pigments, dyes, solid fillers, and combinations thereof. The foam may also include gas-filled voids in the polymer matrix. Such voids typically are formed by including a blowing agent in the polymer matrix material and then activating the blowing agent, e.g., by exposing the polymer matrix material to heat or radiation.

The properties of the article may be adjusted by bonding one or more polymer compositions (e.g., in the form of continuous layers or discrete structures such as stripes) to the foam. Both foamed and non-foamed compositions may be used. A composition may be bonded directly to the foam or indirectly, e.g., through a separate adhesive.

The article may be used as a "foam-in-place" article. Such articles are sized and placed in a recessed area, and then exposed to heat to activate the expandable microspheres. Upon activation, the foam expands due to expansion of the microspheres, thereby filling the recess. In the case of foams having a curable polymer matrix, exposure to heat can also initiate cure of the matrix.

In a second aspect, the invention features an article (e.g., an adhesive article, as defined above) comprising a polymer foam (as defined above) that includes: (a) a plurality of microspheres, at least one of which is an expandable polymeric microsphere (as defined above), and (b) a polymer matrix that is substantially free of urethane crosslinks and urea crosslinks. The matrix includes a blend of two or more polymers in which at least one of the polymers in the blend is a pressure sensitive adhesive polymer (i.e., a polymer that is inherently pressure sensitive, as opposed to a polymer which must be combined with a tackifier in order to form a pressure sensitive composition) and at least one of the polymers is selected from the group consisting of unsaturated thermoplastic elastomers, acrylate-insoluble saturated thermoplastic elastomers, and non-pressure sensitive adhesive thermoplastic polymers.

The foam preferably has a substantially smooth surface (as defined above). In some embodiments, the foam has a pair of major surfaces, one or both of which may be substantially smooth. The foam itself may be an adhesive. The article may also include one or more separate adhesive compositions bonded to the foam, e.g., in the form of a layer. If desired, the foam may be crosslinked.

The polymer foam preferably includes a plurality of expandable polymeric microspheres. It may also include non-expandable microspheres, which may be polymeric or non-polymeric microspheres (e.g., glass microspheres). The properties of the article may be adjusted by directly or indirectly bonding one or more foamed or non-foamed polymer compositions to the foam.

The invention also features multi-layer articles that include the above-described foam articles provided on a major surface of a first substrate, or sandwiched between a pair of substrates. Examples of suitable substrates include wood substrates, synthetic polymer substrates, and metal substrates (e.g., metal foils).

In a third aspect, the invention features a method for preparing an article that includes: (a) melt mixing a polymer composition and a plurality of microspheres, one or more of which is an expandable polymeric microsphere (as defined above), under process conditions, including temperature, pressure and shear rate, selected to form an expandable extrudable composition; (b) extruding the composition through a die to form a polymer foam (as defined above); and (c) at least partially expanding one or more expandable polymeric microspheres before the polymer composition exits the die. It can be preferable for most, if not all, of the expandable microspheres to be at least partially expanded before the polymer composition exits the die. By causing expansion of the expandable polymeric microspheres before the composition exits the die, the resulting extruded foam can be produced to within tighter tolerances.

It is desirable for the polymer composition to be substantially solvent-free. That is, it is preferred that the polymer composition contain less than 20 wt. % solvent, more preferably, contain substantially none to no greater than about 10 wt. % solvent and, even more preferably, contain no greater than about 5 wt. % solvent.

In a fourth aspect, the invention features another method for preparing an article that includes: (a) melt mixing a polymer composition and a plurality of microspheres, one or more of which is an expandable polymeric microsphere (as defined above), under process conditions, including temperature, pressure and shear rate, selected to form an expandable extrudable composition; and (b) extruding the composition through a die to form a polymer foam (as defined above). After the polymer foam exits the die, enough of the expandable polymeric microspheres in the foam remain unexpanded or, at most, partially expanded to enable the polymer foam to be used in a foam-in-place application. That is, the extruded foam can still be further expanded to a substantial degree at some later time. Preferably, the expandable microspheres in the extruded foam retain most, if not all, of their expandability.

In a fifth aspect, the invention features another method for preparing an article that includes: (a) melt mixing a polymer composition and a plurality of microspheres, one or more of which is an expandable polymeric microsphere (as defined above), under process conditions, including temperature, pressure and shear rate, selected to form an expandable extrudable composition; and (b) extruding the composition through a die to form a polymer foam (as defined above) having a substantially smooth surface (as defined above). It is also possible to prepare foams having a pair of major surfaces in which one or both major surfaces are substantially smooth.

The polymer composition preferably has a viscosity, measured at a temperature of 175° C. and a shear rate of 100 $sec^{-1}$, of at least 30 Pascal-seconds (Pa-s), more preferably at least 100 Pa-s and even more preferably at least 200 Pa-s.

The article may be an adhesive article (as defined above), e.g., a pressure sensitive adhesive article or a heat-activated adhesive article. In some embodiments, the foam itself is an adhesive.

Both the expandable extrudable composition and the extruded foam preferably include a plurality of expandable polymeric microspheres (as defined above). The extruded foam and the expandable extrudable composition may also include one or more non-expandable microspheres, which may be polymeric or non-polymeric microspheres (e.g., glass microspheres).

The expandable extrudable composition may be co-extruded with one or more additional extrudable polymer compositions, e.g., to form a polymer layer on a surface of the resulting foam. For example, the additional extrudable polymer composition may be an adhesive composition. Other suitable additional extrudable polymer compositions include additional microsphere-containing compositions.

The method may also include crosslinking the foam. For example, the foam may be exposed to thermal, actinic, or ionizing radiation subsequent to extrusion to crosslink the foam. In addition, the method may include heating the article subsequent to extrusion to cause further expansion. The additional expansion may be due to microsphere expansion, activation of a blowing agent, or a combination thereof.

The invention provides foam-containing articles, and a process for preparing such articles, in which the articles can be designed to exhibit a wide range of properties depending upon the ultimate application for which the article is intended. For example, the foam core may be produced alone or in combination with one or more polymer compositions, e.g., in the form of layers to form multi-layer articles. The ability to combine the foam with additional polymer compositions offers significant design flexibility, as a variety of different polymer compositions may be used, including adhesive compositions, additional foam compositions, removable compositions, layers having different mechanical properties, etc. In addition, through careful control of the foaming operation it is possible to produce a foam having a pattern of regions having different densities.

Both thin and thick foams can be produced. In addition, both adhesive and non-adhesive foams can be produced. In the latter case, the foam may be combined with one or more separate adhesive compositions to form an adhesive article. In addition, it is possible to prepare foams from a number of different polymer matrices, including polymer matrices that are incompatible with foam preparation processes that rely on actinic radiation-induced polymerization of microsphere-containing photopolymerizable compositions. Examples of such polymer matrix compositions include unsaturated thermoplastic elastomers and acrylate-insoluble saturated thermoplastic elastomers. Similarly, it is possible to include additives such as ultraviolet-absorbing pigments (e.g., black pigments), dyes, and tackifiers that could not be used effectively in actinic radiation-based foam processes. It is further possible, in contrast to solvent-based and actinic radiation-based foam processes, to prepare foams having a substantially homogeneous distribution of microspheres. In addition, the present expanded foam (i.e., a foam containing microspheres that have been at least partially expanded) can have a uniform size distribution of the expanded microspheres from the surface to the center of the foam. That is, there is no gradient of expanded microsphere sizes from the surface to the center of the foam, e.g., like that found in expanded foams which are made in a press or a mold. Expanded foams that exhibit such a size distribution gradient of their expanded microspheres can exhibit weaker mechanical properties than such foams that have a uniform size distribution of the expanded microspheres.

Foams with a substantially smooth surface can be produced in a single step. Accordingly, it is not necessary to bond additional layers to the foam in order to achieve a smooth-surfaced article. Substantially smooth-surfaced foams are desirable for a number of reasons. For example, when the foam is laminated to another substrate, the substantially smooth surface minimizes air entrapment between the foam and the substrate. Moreover, in the case of adhesive foams the substantially smooth surface maximizes contact with a substrate to which the foam is applied, leading to good adhesion.

The extrusion process enables the preparation of multi-layer articles in a single step. In addition, when foaming occurs during the extrusion, it is possible, if desired, to eliminate separate post-production foaming processes. Moreover, by manipulating the design of the extrusion die, it is possible to produce foams having a variety of shapes.

It is also possible to prepare "foam-in-place" articles by controlling the process temperature during the initial foam preparation such that expansion of the microspheres is minimized or suppressed. The article can then be placed, e.g., in a recessed area and heated to cause microsphere expansion. "Foam-in-place" articles can also be prepared by including a blowing agent in the expandable extrudable composition and conducting the extrusion process under conditions insufficient to activate the blowing agent. Subsequent to foam preparation, the blowing agent can be activated to cause additional foaming.

Other features and advantages of the invention will be apparent from the following description of the preferred embodiments thereof, and from the claims.

DETAILED DESCRIPTION

Article

The invention features articles that include a polymer foam featuring a polymer matrix and one or more expandable polymer microspheres. Examination of the foam by electron microscopy reveals that the foam microstructure is characterized by a plurality of enlarged polymeric microspheres (relative to their original size) distributed throughout the polymer matrix. At least one of the microspheres (and preferably more) is still expandable, i.e., upon application of heat it will expand further without breaking. This can be demonstrated by exposing the foam to a heat treatment and comparing the size of the microspheres obtain by electron microscopy to their pre-heat treated size (also obtained by electron microscopy).

Figure 1A:
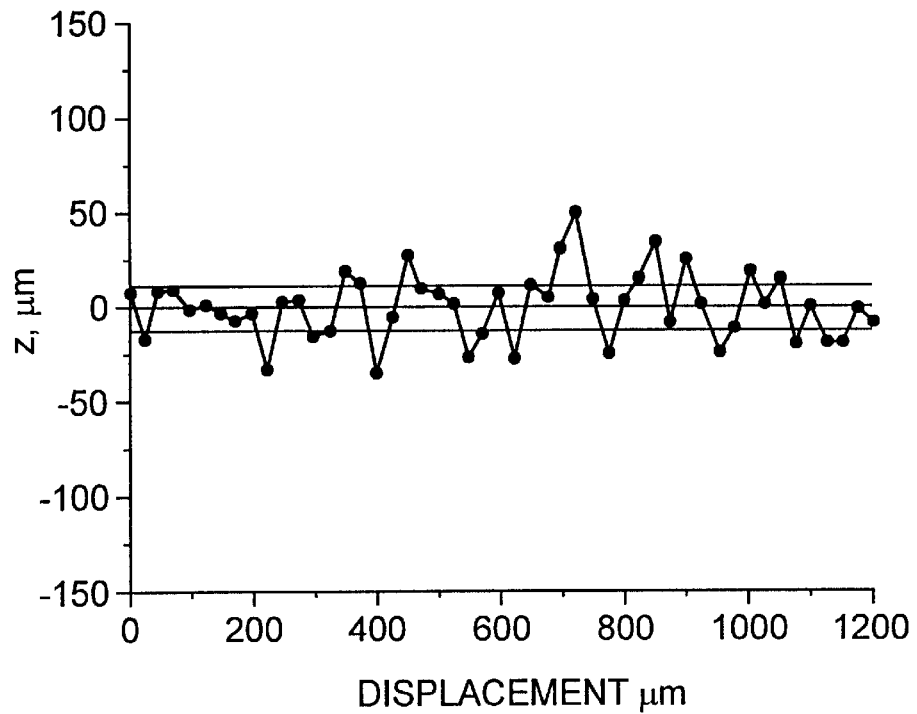
FIG. 1(a) is a plot showing the Ra value obtained by laser triangulation profilometry for the sample described in Example 12.
Figure 2A:
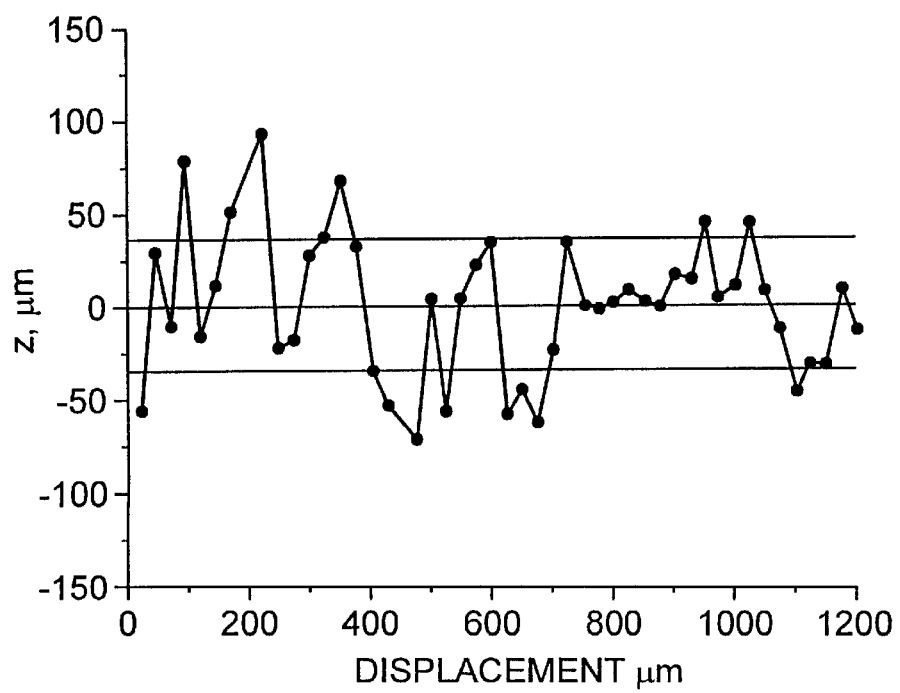
FIG. 2(a) is a plot showing the Ra value obtained by laser triangulation profilometry for the sample described in Example 58.
Figure 1B:
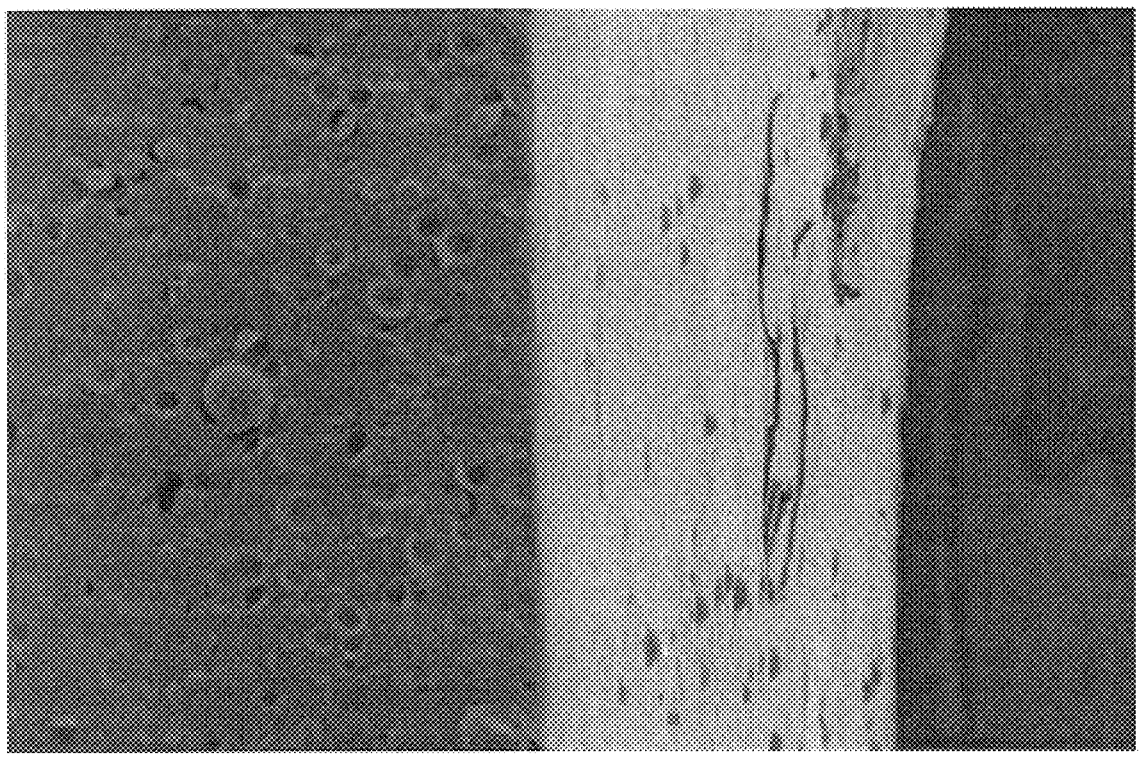
FIG. 1(b) is a photomicrograph obtained by scanning electron microscopy of the surface of the sample described in Example 12.
Figure 2B:
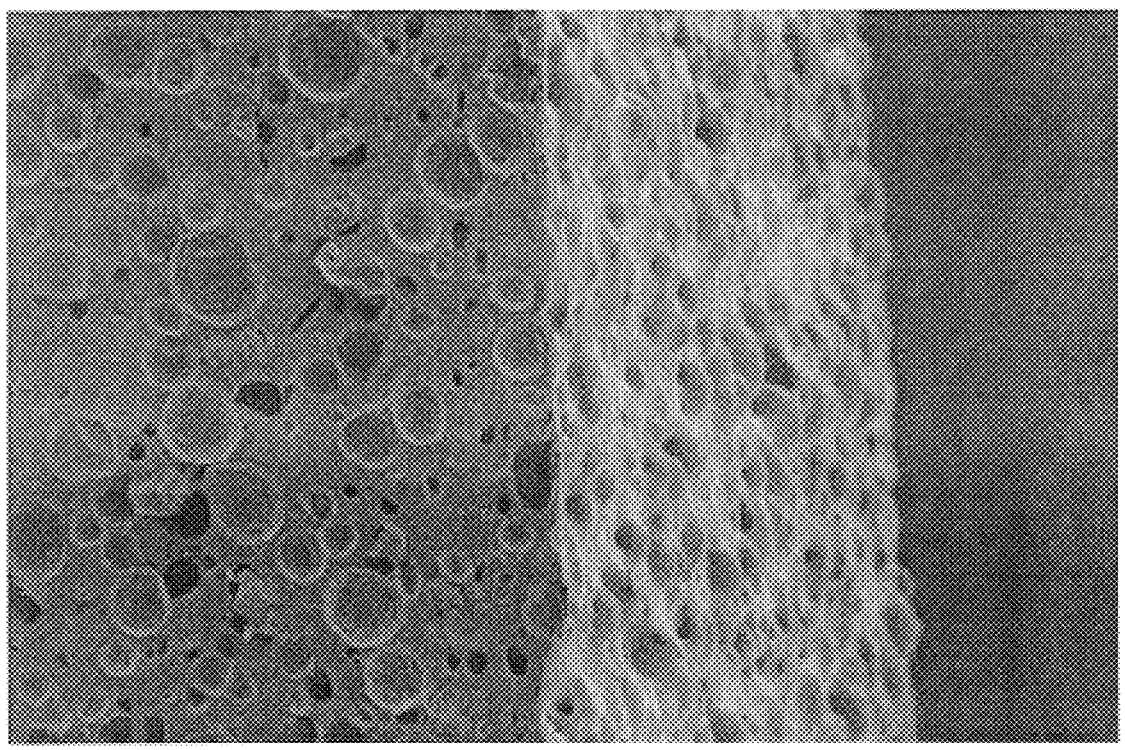
FIG. 2(b) is a photomicrograph obtained by scanning electron microscopy of the surface of the sample described in Example 58.

The foam is further characterized by a surface that is substantially smooth, as defined in the Summary of the Invention, above. Laser triangulation profilometry results and scanning electron photomicrographs are shown in FIGS. 1 and 2 for representative acrylic foams having substantially smooth surfaces prepared as described in Examples 12 and 58, respectively, described in further detail below. Each of the photomicrographs of FIGS. 1(b) and 2(b) includes a 100 micrometer long measurement bar B. Each of the samples in FIGS. 1(b) and 2(b) have been sectioned, with the surface portion being light and the sectioned portion being dark.

Figure 3:
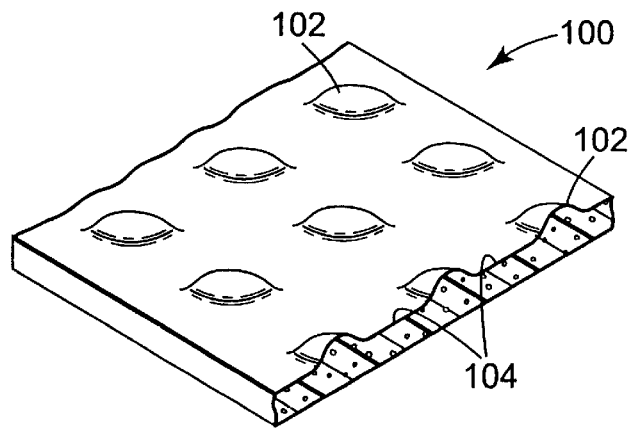
FIG. 3 is a perspective drawing showing a foam having a patterned surface.

The foam may be provided in a variety of forms, including a sheet, rod, or cylinder. In addition, the surface of the foam may be patterned. An example of such a foam is shown in FIG. 3. Foam 100 is in the form of a sheet having a uniform pattern of bumps 102 arranged on the surface of the foam. Such articles are prepared by differential foaming, as described in more detail, below. The differential foaming process creates bumps 102 having a density different from the density of the surrounding areas 104.

A variety of different polymer resins, as well as blends thereof, may be used for the polymer matrix as long as the resins are suitable for melt extrusion processing. For example, it may be desirable to blend two or more acrylate polymers having different compositions. A wide range of foam physical properties can be obtained by manipulation of the blend component type and concentration. The particular resin is selected based upon the desired properties of the final foam-containing article.

One class of useful polymers includes acrylate and methacrylate adhesive polymers and copolymers. Such polymers can be formed by polymerizing one or more monomeric acrylic or methacrylic esters of non-tertiary alkyl alcohols, with the alkyl groups having form 1 to 20 carbon atoms (e.g., from 3 to 18 carbon atoms). Suitable acrylate monomers include methyl acrylate, ethyl acrylate, n-butyl acrylate, lauryl acrylate, 2-ethylhexyl acrylate, cyclohexyl acrylate, iso-octyl acrylate, octadecyl acrylate, nonyl acrylate, decyl acrylate, and dodecyl acrylate. The corresponding methacrylates are useful as well. Also useful are aromatic acrylates and methacrylates, e.g., benzyl acrylate and cyclobenzyl acrylate.

Optionally, one or more monoethylenically unsaturated co-monomers may be polymerized with the acrylate or methacrylate monomers; the particular amount of co-monomer is selected based upon the desired properties of the polymer. One group of useful co-monomers includes those having a homopolymer glass transition temperature greater than the glass transition temperature of the acrylate homopolymer. Examples of suitable co-monomers falling within this group include acrylic acid, acrylamide, methacrylamide, substituted acrylamides such as N,N-dimethyl acrylamide, itaconic acid, methacrylic acid, acrylonitrile, methacrylonitrile, vinyl acetate, N-vinyl pyrrolidone, isobornyl acrylate, cyano ethyl acrylate, N-vinylcaprolactam, maleic anhydride, hydroxyalkylacrylates, N,N-dimethyl aminoethyl (meth) acrylate, N,N-diethylacrylamide, beta-carboxyethyl acrylate, vinyl esters of neodecanoic, neononanoic, neopentanoic, 2-ethylhexanoic, or propionic acids (e.g., available from Union Carbide Corp. of Danbury, Conn.

under the designation "Vynates", vinylidene chloride, styrene, vinyl toluene, and alkyl vinyl ethers.

A second group of monoethylenically unsaturated co-monomers which may be polymerized with the acrylate or methacrylate monomers includes those having a homopolymer glass transition temperature less than the glass transition temperature of the acrylate homopolymer. Examples of suitable co-monomers falling within this class include ethyloxyethoxy ethyl acrylate (Tg=−71° C.) and a methoxypolyethylene glycol 400 acrylate (Tg=−65° C.; available from Shin Nakamura Chemical Co., Ltd. under the designation "NK Ester AM-90G").

A second class of polymers useful for the polymer matrix of the foam includes acrylate-insoluble polymers. Examples include semicrystalline polymer resins such as polyolefins and polyolefin copolymers (e.g., based upon monomers having between 2 and 8 carbon atoms such as low density polyethylene, high density polyethylene, polypropylene, ethylene-propylene copolymers, etc.), polyesters and co-polyesters, polyamides and co-polyamides, fluorinated homopolymers and copolymers, polyalkylene oxides (e.g., polyethylene oxide and polypropylene oxide), polyvinyl alcohol, ionomers (e.g., ethylene-methacrylic acid copolymers neutralized with base), and cellulose acetate. Other examples of acrylate-insoluble polymers include amorphous polymers having a solubility parameter (as measured according to the Fedors' technique) less than 8 or greater than 11 such as polyacrylonitrile, polyvinyl chloride, thermoplastic polyurethanes, aromatic epoxies, polycarbonate, amorphous polyesters, amorphous polyamides, ABS copolymers, polyphenylene oxide alloys, ionomers (e.g., ethylene-methacrylic acid copolymers neutralized with salt), fluorinated elastomers, and polydimethyl siloxane.

A third class of polymers useful for the polymer matrix of the foam includes elastomers containing ultraviolet radiation-activatable groups. Examples include polybutadiene, polyisoprene, polychloroprene, random and block copolymers of styrene and dienes (e.g., SBR), and ethylene-propylene-diene monomer rubber.

A fourth class of polymers useful for the polymer matrix of the foam includes pressure sensitive and hot melt adhesives prepared from non-photopolymerizable monomers. Such polymers can be adhesive polymers (i.e., polymers that are inherently adhesive), or polymers that are not inherently adhesive but are capable of forming adhesive compositions when compounded with tackifiers. Specific examples include poly-alpha-olefins (e.g., polyoctene, polyhexene, and atactic polypropylene), block copolymer-based adhesives, natural and synthetic rubbers, silicone adhesives, ethylene-vinyl acetate, and epoxy-containing structural adhesive blends (e.g., epoxy-acrylate and epoxy-polyester blends).

The expandable microspheres feature a flexible, thermoplastic, polymeric shell and a core that includes a liquid and/or gas which expands upon heating. Preferably, the core material is an organic substance that has a lower boiling point than the softening temperature of the polymeric shell. Examples of suitable core materials include propane, butane, pentane, isobutane, neopentane, and combinations thereof.

The choice of thermoplastic resin for the polymeric shell influences the mechanical properties of the foam. Accordingly, the properties of the foam may be adjusted through appropriate choice of microsphere, or by using mixtures of different types of microspheres. For example, acrylonitrile-containing resins are useful where high tensile and cohesive strength are desired, particularly where the acrylonitrile content is at least 50% by weight of the resin, more preferably at least 60% by weight, and even more preferably at least 70% by weight. In general, both tensile and cohesive strength increase with increasing acrylonitrile content. In some cases, it is possible to prepare foams having higher tensile and cohesive strength than the polymer matrix alone, even though the foam has a lower density than the matrix. This provides the capability of preparing high strength, low density articles.

Examples of suitable thermoplastic resins which may be used as the shell include acrylic and methacrylic acid esters such as polyacrylate; acrylate-acrylonitrile copolymer; and methacrylate-acrylic acid copolymer. Vinylidene chloride-containing polymers such as vinylidene chloride-methacrylate copolymer, vinylidene chloride-acrylonitrile copolymer, acrylonitrile-vinylidene chloride-methacrylonitrile-methyl acrylate copolymer, and acrylonitrile-vinylidene chloride-methacrylonitrile-methyl methacrylate copolymer may also be used, but are not preferred where high strength is desired. In general, where high strength is desired, the microsphere shell preferably has no more than 20% by weight vinylidene chloride, more preferably no more than 15% by weight vinylidene chloride. Even more preferred for high strength applications are microspheres have essentially no vinylidene chloride units.

Examples of suitable commercially available expandable polymeric microspheres include those available from Pierce Stevens (Buffalo, N.Y.) under the designations "F30D," "F80SD," and "F100D." Also suitable are expandable polymeric microspheres available from Akzo-Nobel under the designations "Expancel 551," "Expancel 461," and "Expancel 091." Each of these microspheres features an acrylonitrile-containing shell. In addition, the F80SD, F100D, and Expancel 091 microspheres have essentially no vinylidene chloride units in the shell.

The amount of expandable microspheres is selected based upon the desired properties of the foam product. In general, the higher the microsphere concentration, the lower the density of the foam. In general, the amount of microspheres ranges from about 0.1 parts by weight to about 50 parts by weight (based upon 100 parts of polymer resin), more preferably from about 0.5 parts by weight to about 20 parts by weight.

The foam may also include a number of other additives. Examples of suitable additives include tackifiers (e.g., rosin esters, terpenes, phenols, and aliphatic, aromatic, or mixtures of aliphatic and aromatic synthetic hydrocarbon resins), plasticizers, pigments, dyes, non-expandable polymeric or glass microspheres, reinforcing agents, hydrophobic or hydrophilic silica, calcium carbonate, toughening agents, fire retardants, antioxidants, finely ground polymeric particles such as polyester, nylon, or polypropylene, stabilizers, and combinations thereof. Chemical blowing agents may be added as well. The agents are added in amounts sufficient to obtain the desired end properties.

The properties of the article may be adjusted by combining one or more polymer compositions with the foam. These additional compositions may take several forms, including layers, stripes, etc. Both foamed and non-foamed compositions may be used. A composition may be bonded directly to the foam or indirectly, e.g., through a separate adhesive. In some embodiments, the additional polymer composition is removably bonded to the foam; such compositions can subsequently be stripped from the foam.

Figure 4:
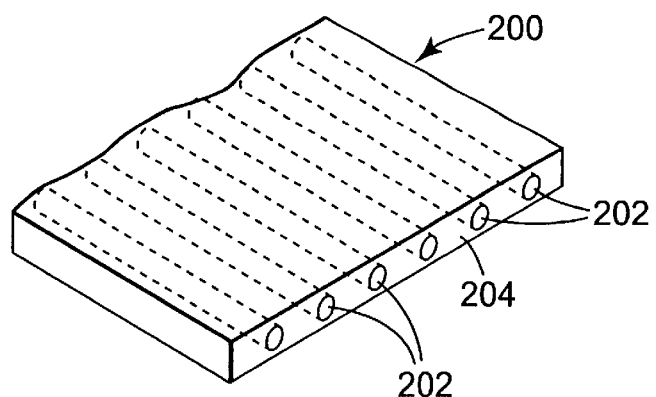
FIG. 4 is a perspective drawing of an article featuring a foam combined with an additional polymer composition.
Figure 5:
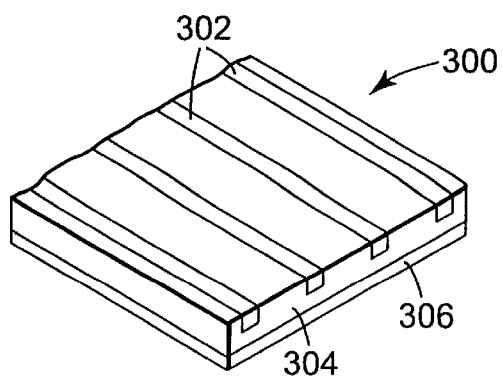
FIG. 5 is a perspective drawing of an article featuring a foam combined with two additional polymer compositions.
Figure 6:
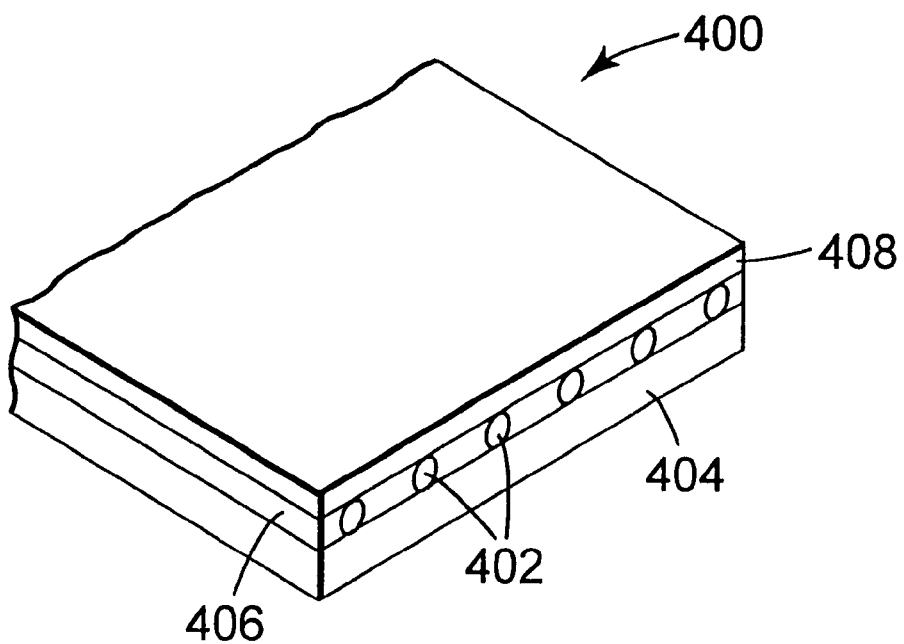
FIG. 6 is a perspective drawing of an article featuring a foam combined with multiple additional polymer compositions.

Examples of articles featuring combinations of a foam and one or more additional polymer compositions are shown in FIGS. 4–6. Referring to FIG. 4, there is shown an article 200 featuring a plurality of foam stripes 202 arranged in a patterned and combined within a separate polymer layer 204. The density of stripes 202 is different from the density of polymer layer 204 surrounding the stripes.

FIG. 5 depicts another article 300 in which a plurality of foam stripes 302 are arranged in a pattern and combined within a separate polymer layer 304. Layer 304, in turn, is bonded to yet another polymer layer 306 on its opposite face. The density of stripes 302 is different from the density of layer 304 surrounding the stripes.

FIG. 6 depicts yet another article 400 in which a plurality of foam stripes 402 are embedded within a multilayer structure featuring polymer layers 404, 406, and 408. The density of stripes 402 is different from the density of layers 404, 406, and 408.

Preferably, additional polymer compositions are bonded to the foam core by co-extruding the extrudable microsphere-containing composition with one or more extrudable polymer compositions, as described in greater detail, below. The number and type of polymer compositions are selected based upon the desired properties of the final foam-containing article. For example, in the case of non-adhesive foam cores, it may be desirable to combine the core with one or more adhesive polymer compositions to form an adhesive article. Other examples of polymer compositions prepared by co-extrusion include relatively high modulus polymer compositions for stiffening the article (semi-crystalline polymers such as polyamides and polyesters), relatively low modulus polymer compositions for increasing the flexibility of the article (e.g., plasticized polyvinyl chloride), and additional foam compositions.

Extrusion Process

Figure 7:
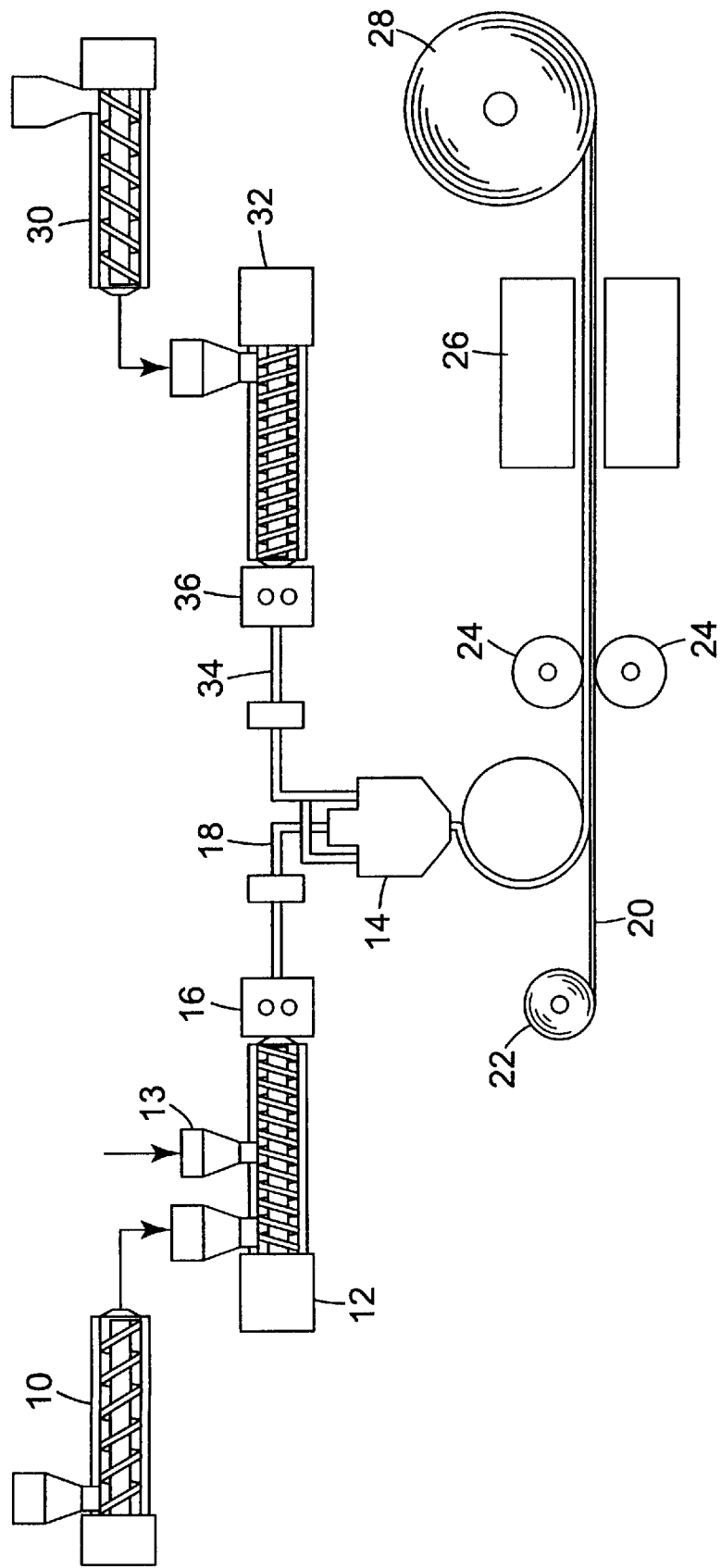
FIG. 7 is a schematic drawing of an extrusion processor for preparing articles according to the invention.

Referring to FIG. 7, there is shown an extrusion process for preparing an article that includes a polymer foam featuring a polymer matrix and one or more expandable polymer microspheres. According to the process, polymer resin is initially fed into a first extruder 10 (typically a single screw extruder) which softens and grinds the resin into small particles suitable for extrusion. The polymer resin will eventually form the polymer matrix of the foam. The polymer resin may be added to extruder 10 in any convenient form, including pellets, billets, packages, strands, and ropes.

Next, the resin particles and all additives except the expandable microspheres are fed to a second extruder 12 (e.g., a single or twin screw extruder) at a point immediately prior to the kneading section of the extruder. Once combined, the resin particles and additives are fed to the kneading zone of extruder 12 where they are mixed well. The mixing conditions (e.g., screw speed, screw length, and temperature) are selected to achieve optimum mixing. Preferably, mixing is carried out at a temperature insufficient to cause microsphere expansion. It is also possible to use temperatures in excess of the microsphere expansion temperature, in which case the temperature is decreased following mixing and prior to adding the microspheres.

Where no mixing is needed, e.g., where there are no additives, the kneading step may be omitted. In addition, where the polymer resin is already in a form suitable for extrusion, the first extrusion step may be omitted and the resin added directly to extruder 12.

Once the resin particles and additives have been adequately mixed, expandable polymeric microspheres are added to the resulting mixture, at a downstream entrance 13 to extruder 12, and melt-mixed to form an expandable extrudable composition. The purpose of the melt-mixing step is to prepare an expandable extrudable composition in which the expandable polymeric microspheres and other additives, to the extent present, are distributed substantially homogeneously throughout the molten polymer resin. Typically, the melt-mixing operation uses one kneading block to obtain adequate mixing, although simple conveying elements may be used as well. The temperature, pressure, shear rate, and mixing time employed during melt-mixing are selected to prepare this expandable extrudable composition without causing the microspheres to expand or break; once broken, the microspheres are unable to expand to create a foam. Specific temperatures, pressures, shear rates, and mixing times are selected based upon the particular composition being processed.

Following melt-mixing, the expandable extrudable composition is metered into extrusion die 14 (e.g., a contact or drop die) through a length of transfer tubing 18 using a gear pump 16 that acts as a valve to control die pressure and thereby prevent premature expansion of the microspheres. The temperature within die 14 is preferably maintained at substantially the same temperature as the temperature within transfer tubing 18, and selected such that it is at or above the temperature requires to cause expansion of the expandable microspheres. However, even though the temperature within tubing 18 is sufficiently high to cause microsphere expansion, the relatively high pressure within the transfer tubing prevents them from expanding. Once the composition enters die 14, however, the pressure drops because the volume of the die is greater than the volume of the tubing. The pressure drop, coupled with heat transfer from the die, causes the microspheres to expand within the die, leading to foaming. The pressure within the die continues to drop further as the composition approaches the exit, further contributing to microsphere expansion within the die. The flow rate of polymer through the extruder and the die exit opening are maintained such that as the polymer composition is processed through the die, the pressure in the die cavity remains sufficiently low to allow expansion of the expandable microspheres before the polymer composition reaches the exit opening of the die.

The shape of the foam is dictated by the shape of die 14. Although a variety of shapes may be produced, the foam is typically produced in the form of a continuous or discontinuous sheet.

As shown in FIG. 7, the foam may optionally be combined with a liner 20 dispensed from a feed roll 22. Suitable materials for liner 20 include silicone release liners, polyester films (e.g., polyethylene terephthalate films), and polyolefin films (e.g., polyethylene films). The liner and the foam are then laminated together between a pair of nip rollers 24. Following lamination, the foam is optionally exposed to radiation from an electron beam source 26 to crosslink the foam; other sources of radiation (e.g., ion beam and ultraviolet radiation) may be used as well. Crosslinking improves the cohesive strength of the foam. Following exposure, the laminate is rolled up onto a take-up roll 28.

If desired, the smoothness of one or both of the foam surfaces can be increased by using a nip roll to press the foam against a chill roll after the foam exits die 14. It is also possible to emboss a pattern on one or both surfaces of the foam by contacting the foam with a patterned roll after it exits die 14.

The extrusion process may be used to prepare "foam-in-place" articles. Such articles find application, for example, as gaskets or other gap-sealing articles. Foam-in-place articles may be prepared by carefully controlling the pressure and temperature within die 14 and transfer tubing 18 such that microsphere expansion does not occur to any appreciable extent. The resulting article is then placed in a desired area, e.g., a recessed area and heated at a temperature sufficiently high to cause microsphere expansion.

Foam-in-place articles can also be prepared by incorporating a chemical blowing agent such as 4,4'-oxybis(benzenesulfonylhydrazide) in the expandable extrudable composition. The blowing agent can be activated subsequent to extrusion to cause further expansion, thereby allowing the article to fill the area in which it is placed.

The extrusion process can also be used to prepare patterned foams having areas of different densities. For example, downstream of the point at which the article exits the die, the article can be selectively heated, e.g., using a patterned roll or infrared mask, to cause microsphere expansion in designated areas of the article.

The foam may also be combined with one or more additional polymer compositions, e.g., in the form of layers, stripes, rods, etc., preferably by co-extruding additional extrudable polymer compositions with the microsphere-containing extrudable compositions. FIG. 7 illustrates one preferred co-extrusion process for producing an article featuring a foam sandwiched between a pair of polymer layers. As shown in FIG. 7, polymer resin is optionally added to a first extruder 30 (e.g., a single screw extruder) where it is softened and ground into particles. The resin particles are then fed to a second extruder 32 (e.g., a single or twin screw extruder) where they are mixed with any desired additives. The resulting extrudable composition is then metered to the appropriate chambers of die 14 through transfer tubing 34 using a gear pump 36. The resulting article is a three-layer article featuring a foam core having a polymer layer on each of its major faces.

It is also possible to conduct the co-extrusion process such that a two-layer article is produced, or such that articles having more than three layers (e.g., 10–100 layers or more) are produced by equipping die 14 with an appropriate feed block, or by using a multi-vaned or multi-manifold die. Multilayer foam articles can also be prepared by laminating additional polymer layers to the foam core, or to any of the co-extruded polymer layers after the article exits die 14. Other techniques which can be used include stripe coating.

Use

The foam-containing articles are useful in a variety of applications, including aerospace, automotive, and medical applications. The properties of the articles are tailored to meet the demands of the desired applications. Specific examples of applications include vibration damping articles, medical dressings, tape backings, retroreflective sheet backings, anti-fatigue mats, abrasive article backings, gaskets, and sealants.

The invention will now be described further by way of the following examples.

EXAMPLES

Test Methods

Surface Roughness

The surface topology as a function of displacement was measured using a Laser Triangulation Profilometer (Cyberscan 200, available from Cyberoptics of Minneapolis, Minn.). All the measurements were collected at room temperatures using a HeNe laser (654 nm) with a point range selector resolution of 1 micrometer (PRS-40). The laser was programmed to move across the sample in discrete jumps of 25 micrometers with a total of 50 jumps (total length=1250 micrometers). The sample size measured 1250×1250 micrometers. The roughness data was leveled by subtracting a linear regression fit of the data and positioning the average at zero. The surface roughness, Ra, was calculated using the following relationship:

$$R_a = \frac{1}{L_m} \int_0^{L_m} |z(x)| dx \quad (1)$$

where $R_a$ is the surface roughness, $L_m$ is the total displacement length, and z is the height at a displacement of x.

90° Peel Adhesion

A foam pressure-sensitive adhesive sheet is laminated to a sheet of 0.127 mm thick anodized aluminum. A strip of tape measuring 1.27 cm by 11.4 cm is cut from the sheet and applied to a metal substrate that was painted with a basecoat/clear coat automotive paint composition (RK-7072 from DuPont Co.) The strip is then rolled down using four total passes of using a 6.8 kg metal roller. The sample is aged at one of the following conditions before testing:

1 hour at room temperature (22° C.)
3 days at room temperature (22° C.)
7 days at 70° C.
5 days at 100° C. and 100% humidity After aging, the panel is mounted in an Instron™ Tensile Tester so that the tape is pulled off at a 90 degree angle at a speed of 30.5 cm per minute. Results are determined in pounds per 0.5 inch, and converted to Newtons per decimeter (N/dm).

T-Peel Adhesion

This test is performed according to ASTM D3330-87 except as specified. A strip of foam tape measuring 11.43 cm by 1.27 cm wide is laminated between two anodized aluminum strips (10.16 cm long by 1.59 cm wide by 0.127 mm thick). The laminated test sample is conditioned for at least 1 hour at room temperature (22° C.), and then tested for cohesive strength using an Instron™ Tensile tester at a 180° peel and a crosshead speed of 30.48 inches per minute. The test results are recorded in pounds per ½ inch width and results are converted to newtons/decimeter (N/dm).

Tensile and Elongation

This test is performed according to ASTM D412-92 except as specified. A sample of the foam is cut into a "dog bone" shape having a width of 0.635 mm in the middle portion. The ends of the sample are clamped in an Instron Tensile Tester and pulled apart at a crosshead speed of 50.8 cm per minute. The test measures peak stress (in pounds per square inch and converted to kiloPascals (kPas)), the amount of elongation or peak strain (in % of the original length), and peak energy (in foot pounds and converted to joules (J).

Static Shear Strength

A 2.54 cm by 2.54 cm strip of pressure-sensitive adhesive foam tape is laminated to a 0.51 mm thick anodized aluminum panel measuring about 2.54 cm by 5.08 cm. A second panel of the same size is placed over the tape so that there is a 2.54 cm overlap, and the ends of the panels extend oppositely from each other. The sample is then rolled down with a 6.8 kg metal roller so that the total contact area of the sample to the panel was 2.54 cm by 2.54 cm. The prepared panel is conditioned at room temperature, i.e., about 22° C. for at least 1 hour. The panel is then hung in a 70° C. oven and positioned 2 degrees from the vertical to prevent a peel mode failure. A 750 gram weight is hung on the free end of the sample. The time required for the weighted sample to fall off of the panel is recorded in minutes. If no failure has occurred within 10,000 minutes, the test is discontinued and results are recorded as 10,000+minutes.

Hot Melt Composition 1

A pressure-sensitive adhesive composition was prepared by mixing 90 parts of IOA (isooctyl acrylate), 10 parts of AA (acrylic acid), 0.15 part 2,2 dimethoxy-2-phenylacetophenone (Irgacure™ 651 available from Ciba Geigy) and 0.03 parts of IOTG (isooctyl thioglycolate). The composition was placed into packages measuring approximately 10 cm by 5 cm by 0.5 cm thick packages as described in Assignee's co-pending patent application No. 08/919756. The packaging film was a 0.0635 thick ethylene vinylacetate copolymer (VA-24 Film available from CT Film of Dallas, Tex.) The packages were immersed in a water bath and at the same time exposed to ultraviolet radiation at an intensity of 3.5 milliwatts per square centimeter and a total energy of 1627 milliJoules per square centimeter as measured in NIST units to form a packaged pressure-sensitive-adhesive. The resulting adhesive had an IV (intrinsic viscosity of about 1.1 deciliters/gram, Mw of $5.6 \times 10^5$ g/mol and Mn of $1.4 \times 10^5$ g/mol.

Hot Melt Composition 2

A packaged adhesive was prepared following the procedure for Hot Melt Composition 1 except that 97 parts of IOA and 3 parts of AA were used.

Hot Melt Composition 3

A packaged adhesive was prepared following the procedure for Hot melt Composition 1 except that 80 parts IOA and 20 parts AA were used.

Hot Melt Composition 4

A hot melt pressure-sensitive adhesive composition having 96 parts IOA and 4 parts methacrylic acid was prepared following the procedure described in U.S. Pat. No. 4,833,179 (Young et al.) incorporated in its entirety herein by reference.

Hot Melt Composition 5

A packaged adhesive was prepared following the procedure for Hot Melt Composition 1 except that 46.25 parts of isooctyl acrylate, 46.25 parts of n-butyl acrylate (nBA), and 7.5 parts of acrylic acid were used. The packaged adhesives was then compounded in a twin screw extruder with 17% Escorez™ 180 tackifier (available from Exxon Chemical Corp.) to form Hot Melt Composition 5.

Hot Melt Composition 6

A hot melt adhesive composition was prepared following the procedure for Hot Melt Composition 5 except that the packaged adhesive composition was 45 parts IOA, 45 parts nBA, and 10 parts AA were used.

Hot Melt Composition 7

A packaged hot melt composition was prepared following the procedure for Hot Melt Composition 1 except that the composition in the packages also included 0.25 parts of acryloxybenzophenone per one hundred parts of acrylate.

Hot Melt Composition 8

A hot melt composition having 90 parts IOA and 10 parts AA was prepared following the procedure for Example 1 of U.S. Pat. No. 5,637,646 (Ellis), incorporated in its entirety herein by reference.

Hot Melt Composition 9

A hot melt composition having 95 parts IOA and 5 parts AA was prepared following the procedure for Hot Melt Composition 1.

Hot Melt Composition 10

A hot melt composition having 90 parts 2-ethylhexyl acrylate and 10 parts AA was prepared following the procedure for Hot Melt Composition 1.

Extrusion Process

The packaged hot melt composition was fed to a 51 mm single screw extruder (Bonnot) and compounded. The temperatures in the extruder and the flexible hose at the exit end of the extruder were all set at 93.3° C. and the flow rate from was controlled with a Zenith gear pump. The compounded adhesive was then fed to a 30 mm co-rotating twin screw extruder with three additive ports (Werner Pfleider) operating at a screw speed of 200 rpm with a flow rate of about 10 pounds/hour (4.5 kilograms/hour). The temperature for all of the zones in the twin screw extruder was set at the specific temperatures indicated in the specific examples. Expandable polymeric microspheres were added downstream to the third feed port about three-fourths of the way down the extruder barrel. The hose and die temperatures were set at the temperatures indicated for the specific examples. The extrudate was pumped to a 15.24 cm wide drop die that was shimmed to a thickness of 1.016 mm. The resulting foam sheets had a thickness of about 1 mm. The extruded sheet was cast onto a chill roll that was set at 7.2° C., cooled to about 25° C., and then transferred onto a 0.127 mm thick polyethylene release liner.

Examples 1–5

Foam sheets for Examples 1–5 were prepared using Hot Melt Composition 1 in the process described above using varying amounts of expandable polymeric microspheres having a shell composition containing acrylonitrile and methacrylonitrile (F100D available from Pierce Stevens, Buffalo, N.Y.). The amounts of microspheres in parts by weight per 100 parts of adhesive composition (EMS - pph) are shown in Table 1. The extruder temperatures were set at 93.3° C., and the hose and die temperatures were set at 193.3° C. After cooling, the extruded foam sheets were transferred to a 0.127 mm thick polyethylene film and crosslinked using an electron beam processing unit (ESI Electro Curtain) operating at an accelerating voltage of 300 keV and at a speed of 6.1 meters per minute. The measured e-beam dose was 4 megaRads (mrads). All of the foams were tacky. The foam sheets in Examples 1,2,4, and 5 were bonded (e.g., laminated) to a two-layer film adhesive using pressure from a nip roll to make a tape. The first layer of the film adhesive was prepared by dissolving 10 parts polyamide (Macromelt 6240 from Henkel) in a solvent blend of 50 parts isopropanol and 50 parts n-propanol, coating the solution onto a release liner, and drying and oven at 121° C. for about 15 minutes. The second layer of the film adhesive was a solvent based pressure sensitive adhesive having a composition of 65 parts IOA, 30 parts methyl acrylate, and 5 parts AA made according to the method disclosed in Re24906 (Ulrich), incorporated herein by reference. A release liner was then placed over the solvent based pressure-sensitive adhesive, and the polyamide side of the film adhesive was pressure laminated to the foam. The tapes were tested for 90° peel adhesive, T-peel adhesion, tensile and elongation, and static shear strength. Test results and foam densities for all of the examples are shown in Table 1.

The foam of Example 1 had a surface roughness ($R_a$) of 29 micrometers.

Example 6

A foam sheet was prepared following the procedure for Example 3 except that the extruder temperatures were set at 121° C., and the hose and die temperatures were set at 177° C. After cooling, the foam was crosslinked with a dose of 8 mrads.

Examples 7–9

Pressure-sensitive adhesive coated foam tapes were prepared following the procedure for Example 1 except that the extruder temperatures were set at 121° C. and the amounts of microspheres were 6, 8, and 10 pph for Examples 7,8, and 9 respectively.

Examples 10–13

Foam sheets were prepared following the procedure for Example 3 except that the extruder temperatures were set at 82° C., the hose and die temperatures were set at 104° C., and according to the conditions specified below.

For Example 10, 2 pph expandable polymeric microspheres (F50D available from Pierce Stevens) were used and the extruder flow rate was 4.08 kg per hour.

For Example 11, 2 pph expandable polymeric microspheres having a shell composition containing acrylonitrile, vinylidene chloride, and methylmethacrylate (Expancel 461 encapsulated microspheres available from Akzo Nobel) were used.

For Example 12, 2 pph expandable polymeric microspheres having a shell composition containing acrylonitrile, methacrylonitrile, and methyl methacrylate (Expancel 091 available from Akzo Nobel) were used, the extruder temperatures were set at 93.9° C., and the hose and die temperatures were set at 193.3° C. The foam was measured for mean free spacing. The surface roughness ($R_a$) was 14 micrometers, and a portion of the foam is shown in FIG. 1($a$) and 1($b$).

Example 13 was prepared following the procedure for Example 12 except that it used 2 pph expandable polymeric microspheres having a shell containing acrylonitrile, methacrylonitrile, and methyl methacrylate (F80SD microspheres available from Pierce Stevens) and the extruder temperatures were set at 93.3° C. Additionally, 0.15 parts by weight per one hundred parts of acrylate of 2,4-bis (trichloromethyl)-6-4-methoxyphenyl)-s-triazine was mixed with the expandable polymeric microspheres and added to the extruder. The resulting foam was crosslinked with a mercury vapor lamp with 500 milliJoules/square centimeter of energy (NIST units). The foam had a surface roughness ($R_a$) of 33 micrometers.

Examples 14–15

Pressure-sensitive adhesive foam tapes were prepared following the procedures for Examples 2 and 3, respectively, except that the extruder temperatures were set at 121° C., and 10% by weight of a melted tackifier (Escorez™ 180 obtained from Exxon Chemical Co.) was added to the first port in the extruder barrel. The flow rate of the extrudate was 4.08 kg per hour of compounded acrylate and 0.45 kg per hour of tackifier. The cooled foam was crosslinked with a dose of 8 mrads.

Example 16

A pressure-sensitive adhesive foam tape was prepared following the procedure for Example 2 except that 0.2 parts per one hundred parts of acrylate of a chemical blowing agent (of 4,4' oxybis(benzenesulfonylhydrazide) obtained as Celogen OT from Uniroyal Chemical Co.) was mixed with the microspheres and to added to the extruder.

Example 17

A pressure-sensitive adhesive foam tape was prepared following the procedure for Example 2 except that the extruder temperatures were maintained at 110° C. A mixture of 50 parts by weight F80SD expandable polymeric microspheres and 50 parts of a chemical blowing agent mixed (BIH, a mixture of 85% sodium bicarbonate and 15% citric acid, available from Boehringer-Ingelheim) was added at a rate of 2 pph. The extruder rate flow was 3.54 kg per hour. The resulting foam was crosslinked with as in Example 1 at a dose of 6 mrads.

Example 18

A foam sheet was prepared following the procedure for Example 3 except that 1.6 pph of F80SD expandable polymeric microspheres were added as well as 0.4 pph glass bubbles (S-32 available from Minnesota Mining & Manufacturing Company). The microspheres and glass bubbles were mixed together before adding to the extruder.

The foam had a surface roughness ($R_a$) of 24 micrometers on one major surface and 21 micrometers on the other major surface.

Examples 19–20

Foam sheets were prepared following the above extrusion process using Hot Melt Composition 3 and with 2 pph expandable polymeric microspheres (F80SD). The extruder temperatures were set at 110° C., and the hose and die temperatures were set at 193° C. The extruder feed rate was 3.58 kg/hr. Example 20 also included a plasticizer (Santicizer 141 available from Monsanto) and which was fed into the extruder at 0.36/hr. The foams were crosslinked following the procedure in Example 1. Example 19 was further laminated to the film adhesive of Example 1.

Example 21

A foam sheet was prepared following the procedure for Example 20 except that Hot Melt Composition 4 was fed directly into the twin screw extruder, and 4 pph F80SD expandable polymeric microspheres were used.

Examples 22–27

Pressure-sensitive adhesive foam sheets having the film adhesive of Example 2 were prepared following the procedure for Example 2 except that F80 expandable polymeric microspheres were used instead of F100D and the extruder temperatures were set at 104° C. Additives were also fed to the first extruder port in the type and amount for each example as follows:

Example 22—10% by weight of the extrudate of polyethylene (Engage™ 8200 available from Dow Chemical Co.) was added to the extruder at a rate of 0.45 kg/hr in the first port.

Example 23—20% by weight of the extrudate of styrene-isoprene-styrene block copolymer (Kraton™ D1107available from Shell Chemical Co.) was added to the extruder at a rate of 0.9 kg/hr. The foam had a surface roughness ($R_a$) of 25 micrometers on one major surface and 19 micrometers on the other major surface.

Example 24—Same as Example 23 except that no other adhesive was laminated to the foam.

Example 25—25% by weight of the extrudate of polyester (Dynapol™ 1402 (available from Huls America) was added to the extruder at a rate of 1.13 kg/hr.

Example 26—Same as Example 25 except that no other adhesive was laminated to the foam.

Example 27

A pressure-sensitive adhesive foam sheet was prepared using Hot Melt Composition 7 and 2 pph expandable polymeric microspheres (F80SD). The extruder temperatures were set at 104° C. and the hose and die temperatures were set at 193° C. The resulting foam was cooled and crosslinked with an electron beam dose of 4 mrads at an accelerating voltage of 300 kilo-electron volts (Kev).

Example 28

A single layer foam sheet was prepared following the procedure for Example 3 except a 25.4 cm wide vane coextrusion die was used instead of a drop die, the extruder temperature was set at 104° C., and F80SD expandable polymeric microspheres were used. There was no flow of material through the outer vanes. The cooled foam was crosslinked with an electron beam dose of 6 mrads at an accelerating voltage of 300 Kev.

Example 29

A foam sheet prepared following the procedure for Example 28 except that Hot Melt Composition 2 was used.

Example 30

A foam sheet for was prepared following the procedure for Example 29 except that F100D expandable polymeric microspheres were used.

Examples 31–33

Foam sheets were prepared following the procedure for Example 28 except that the outer vanes were open and a layer of Hot Melt Composition 5 was coextruded on each major surface of the foam sheet. The thickness of the layer of Composition 3 was 50 micrometers, 100 micrometers and 150 micrometers (i.e., 2 mils, 4 mils, and 6 mils) for Examples 31, 32, and 33 respectively. The extruder and hose temperatures for the additional layers were set at 177° C.

The foam sheet of Example 31 had a surface roughness of ($R_a$) 24 micrometers.

Example 34

A foam sheet was prepared following the procedure for Example 31 except that the extruder temperatures were set at 93.3° C. and the hose and die temperatures were set at 171° C. and a tackifier was added. The extruder feed rate was 4.08 kg/hr for Composition 1 and 0.45 kg/hr for a tackifier (Escorez™ 180). Hot Melt Composition 5 was coextruded to a thickness of 100 micrometers on each major surface of the foam. The coextruded composite was crosslinked with an electron beam at an accelerating voltage of 275 Kev and a dose of 8 mrads.

Example 35

A foam sheet was prepared following the procedure for Example 34 except that instead of the tackifier, low density polyethylene (Dowlex™ 2517 available from Dow Chemical Co.)) was added to the extruder at feed rate of 1.36 kg/hr and Composition 1 was fed in at a rate of 3.18 kg/hr. Hot melt Composition 6 was coextruded to a thickness of 50 micrometers on each major surface of the foam. The resulting coextruded composite was cooled and crosslinked with an electron beam accelerating voltage of 250 Kev and a dose of 6 mrads.

Examples 36–37

Pressure-sensitive adhesive foam sheets were prepared following the procedure for Example 31 except that the microspheres used were a 50/50 blend of F80SD and F100D microspheres and the extruder temperatures were set at 93° C., and the hose and die temperatures were set at 171° C. Example 36 was crosslinked with an e-beam accelerating voltage of 250 Kev and a dose of 6 mrads. The outer vanes of the die were opened for Example 37 and the foam was coextruded with 0.15 mm thick layer of low density polyethylene (Dowlex™ 2517) on one major surface of the foam. After cooling, the polyethylene layer could be removed from the adhesive. This example illustrates the pressure-sensitive adhesive foam with a liner. Furthermore, the two layer composite can be cross-linked with an electron beam to bond the foam permanently to the polyethylene.

Example 38

A pressure-sensitive adhesive foam sheet was prepared following the procedure for Example 28 except that Hot Melt Composition 8 was fed directly to the twin screw extruder.

Example 39

A pressure-sensitive adhesive foam sheet was prepared following the procedure for Example 19 except that Hot Melt Composition 9 was used and the extruder feed rate was 4.5 kg/hr.

Examples 40–42

Foam sheets were prepared by extruding Composition 1 with ethylene vinyl acetate copolymer (EVA). The EVA used for Examples 40, 41, and 42 were Elvax™ 250 (melt index of 25, vinyl acetate content of 28%), Elvax™ 260 (melt index of 6.0, vinyl acetate content of 28%), and Elvax™ 660 (melt index of 2.5, vinyl acetate content of 12%) respectively. All of the EVAs were obtained from DuPont Co. Composition 1 was fed to the extruder at a rate of 2.7 kg/hr and the EVA was fed at a rate of 1.8 kg/hr. A loading of 3 pph F100D expandable polymeric microspheres was used. The extruder temperatures were set at 104° C. and the hose and die temperatures were set at 193° C. Additionally, Examples 40 and 41 were coextruded with a 0.064 mm thick layer of Hot Melt Composition 1 on both major surfaces of the foam. All of the coextruded foams were crosslinked with an electron beam accelerating voltage of 300 Kev and a dose of 6 mrad. The surface roughness ($R_a$) of Example 40 was 27 micrometers.

Example 43

A non-tacky foam sheet was prepared following the procedure for Example 40 except that only EVA (Elvax™ 250) was extruded with 3 pph expandable polymeric microspheres (F100D). The surface roughness ($R_a$) was 23 micrometers on one major surface of the foam and 27 micrometers on the other major surface of the foam.

Example 44

A foam sheet was prepared following the procedure for Example 40 except that instead of EVA, a high density polyethylene (Dowlex™ IP-60 available from Dow Chemical Co.). The feed rates of Composition 1 and the polyethylene were 3.63 kg/hr and 0.91 kg/hr, respectively.

Example 45

A foam sheet was prepared following the procedure for Example 44 except that a low density polyethylene (Dowlex™ 2517) was used. The feed rates of Composition 1 and the polyethylene were 3.18 kg/hr and 1.36 kg/hr, respectively.

Example 46

A foam sheet was prepared following the procedure for Example 44 except that Hot Melt Composition 9 was extruded with a polyester (Dynapol™ 1157 available from Huls) and 3 pph expandable polymeric microspheres (F80). The extruder temperature was set at 93° C. and the hose and die temperatures were set at 171° C. The end plates of the die were set at a temperature of 199° C. to form a uniform thickness across the sheet. The feed rates of Composition 9 and the polyester were 3.18 kg/hr and 1.36 kg/hr, respectively. The resulting foam was cooled and then crosslinked with an electron beam accelerating voltage of 275 Kev and a dose of 6 mrads.

Example 47

A nontacky foam sheet was prepared following the procedure for Example 46 except that only polyester (Dynapol™ 1157) was extruded with 4 pph expandable polymeric microspheres (F80SD). The foam had a surface roughness ($R_a$) of 27 micrometers.

Example 48

A 2.54 cm diameter cylindrical foam was prepared following the procedure of Example 44 except that both Hot Melt Composition 1 and the high density polyethylene were fed to the extruder at a rate of 2.27 kg/hr with 2 pph expandable polymeric microspheres (F80SD). The die was removed so the foam was extruded from the hose in a cylindrical shape.

Example 49

A 1.27 cm diameter cylindrical foam was prepared following the procedure of Example 23 except that both Hot Melt Composition 1 and the block copolymer were fed to the extruder at a rate of 2.27 kg/hr with 2 pph expandable polymeric microspheres (F80SD). The die was removed and the foam was extruded from the hose in a cylindrical shape.

Examples 50–52

A foam sheet for Example 50 was prepared by feeding a styrene-isoprene-styrene block copolymer (Kraton™ D1107) to the twin screw extruder of Example 1 at a feed rate of 1.8 kg/hr. A tackifier (Escorez™ 1310 LC, available from Exxon Chemical Co.) was fed into the first port at a feed rate of 1.8 kg/hr. and expandable polymeric microspheres (F80SD) were fed to the third port at a rate of 2 parts per one hundred parts of block copolymer and tackifier. The extruder temperatures were set at 121° C. and the hose and die temperatures were set at 193° C. The resulting foam adhesive had a density of 33.7 lbs/cubic foot (539.2 Kg/m³)

In Example 51, a foam sheet was prepared following the procedure of Example 51 except that 8 pph of F80SD expandable polymeric microspheres were used. The resulting foam adhesive had a density of 16.5 lbs/cubic ft (264 kg/m³).

In Example 52, a foam sheet was prepared following the procedure of Example 51 except that the block copolymer was styrene-ethylene-butylene-styrene block copolymer (Kraton G1657 available from Shell Chemical Co.) and the tackifier was Arkon P-90 (available from Arakawa Chemical USA). The resulting foam adhesive had a density of 36.9 lbs/cubic ft (590.4 kg/m³).

Example 53

A foam sheet was prepared following the procedure for Example 31 except that the extruder temperatures were set at 93° C., and the hose and die temperatures were set at 171° C. The foam was coextruded a 0.1 mm layer of adhesive on each major surface of the sheet. The adhesive was a tackified styrene-isoprene-styrene block copolymer (HL2646 available from HB Fuller). The resulting foam had a density of 29 lbs/cubic foot (464 kg/m³).

Examples 54–57

Foam sheets were prepared by feeding polyhexene having an intrinsic viscosity of 2.1 to the twin screw extruder at a rate of 4.5 kg/hr and expandable polymeric microspheres (F100D) at a rate of 2 pph for Example 54 and 4 pph for Example 55. Foam sheets for Examples 56 and 57 were prepared following the procedure for Examples 54 and 55, respectively, except that the polyhexene was fed to the extruder at a rate of 3.31 kg/hr and a tackifier (Arkon P-115 available from Arakawa Chemical USA) was fed to the first port at a rate of 1.63 kg/hr, and the expandable polymeric microspheres were mixed with 0.3 pph 2,4-bis (trichloromethyl)-6-4-methoxyphenyl)-s-triazine before adding to the extruder.

Example 58

Hot Melt Adhesive Composition 1 was processed in a 10.16 mm Bonnot single screw extruder. The extruder was operated at room temperature, relying only on mechanically generated heat to soften and mix the composition. The mixture was then fed into Zone 1 of a twin screw extruder (40 mm Berstorff (ZE-40) co-rotating twin screw extruder) where it was mixed with expandable polymeric microspheres (F100). A standard compounding screw design was used with forward kneading in Zone 2, reverse kneading in Zone 4, Zone 6, and Zone 8 with self-wiping conveying elements in the remaining zones. Screw speed was 125 RPM resulting in operating pressures of 52.7 kiloPascals and total flow rates of 11.3 kg/hr. The temperatures in the extruder were set at 104° C., and the hose and die temperatures were set at 193° C. This temperature profile prevented expansion during compounding and minimize the rupturing of the expandable polymeric microspheres. Flow of the extrudate was controlled using a Normag gear pump. The expandable polymeric microspheres were metered into Zone 7 of the twin screw extruder using a Gehricke feeder (GMD-60/2) at rates of 0.23 kg/h. A 15.24 cm wide drop die shimmed at 1 mm was operated at 193° C. The web was cast onto a chilled cast roll and laminated to a release liner at a speed of 1.5 meters per minute. Following coating, the foam sheet was electron beam crosslinked using an ESI Electro Curtain at dose of 8 mrad at accelerating voltage of 300 keV. The resulting foam is shown in FIGS. 2(a) and 2(b). The foam had a surface roughness ($R_a$) of 37 micrometers.

Examples 59–61

These examples illustrate foams that are suitable for use in a foam in place application.

A foam sheet for Example 59 was prepared following the procedure for Example 3 except that it contained 10 pph F80SD expandable polymeric microspheres and the extruder, hose, and die temperatures were all set at 88° C. to minimize expansion of the foam in the die. The foam was not crosslinked and had a density of 55 lbs/cubic foot (880 kg/m$^3$). After subsequent heating to a temperature of 193° C. for five minutes, the density was reduced to 13 pounds/cubic foot (208 kg/m$^3$).

A foam for Example 60 was prepared following the procedure for Example 59 except that Hot Melt Composition 2 was used and the extruder, hose, and die temperatures were all set at 104° C. After cooling, the foam had a density of 60 lbs/cubic ft (960 kg/m$^3$). After subsequent heating to a temperature of 193° C. for five minutes, the density was reduced to 15 lbs/cubic foot (240 kg/m$^3$).

A foam sheet for Example 61 was prepared following the procedure for Example 59 except that polyester (Dynapol™ 1157) was fed to the extruder at a rate of 9 kg/hr, and the temperatures for the extruder, hose, and die were all set at 110° C. The 1.14 mm thick foam sheet was crosslinked with an electron beam accelerating voltage of 275 Kev and a dose of 6 mrad.

Examples 62–70 and Comparative Example C1

Pressure-sensitive adhesive foams were prepared following the procedure for Example 3 with varying amounts of expandable polymeric microspheres shown in Table 2. The extruder temperatures were set at 104° C., and the hose and die temperatures were set at 193° C. Examples 62–66 contained F100D microspheres and Examples 67–70 contained F80SD microspheres. Comparative Example C1 contained no microspheres. None of the examples were crosslinked. The tensile (peak stress), elongation and overlap shear test data show that the properties of the foam can be controlled by the amount of expandable microspheres, and the addition of the microspheres increased the strength of the foam above the same composition that has no microspheres. The overlap shear test used is the same as that described above except that the sample size was 2.54 cm×1.27 cm, using a 1000 g load at 25° C.

TABLE 1

| Ex | EMS pph | Foam Density Kg/m$^3$ | 90° Peel adhesion - N/dm | | | | T-peel N/dm | Peak Stress KPas | Elong % | Peak Energy Joules | Overlap Shear Minutes |
|---|---|---|---|---|---|---|---|---|---|---|---|
| | | | 1 hr 21° C. | 3 days 21° C. | 7 days 70° C. | 5 days 100/100 | | | | | |
| 1 | 1 | 745.6 | 150.5 | 210 | *843.5 | 269.5 | 399 | 758 | 730 | 1.36 | 10,000+ |
| 2 | 2 | 668.8 | 150.5 | 217 | *728 | 301 | 353.5 | 896 | 645 | 1.50 | 10,000+ |
| 3 | 2 | 668.8 | 133 | 224 | *598.5 | 353.5 | 353.5 | 896 | 725 | 1.77 | 10,000+ |
| 4 | 3 | 608 | 143.5 | 217 | *682.5 | 280 | 339.5 | 965 | 548 | 1.50 | 10,000+ |
| 5 | 4 | 561.6 | 136.5 | 206.5 | *612.5 | 332.5 | 203 | 896 | 499 | 1.28 | 10,000+ |
| 6 | 3 | 672 | 122.5 | 213.5 | *672 | 203 | 262.5 | 1172 | 508 | 1.24 | 10,000+ |
| 7 | 6 | NT | 206.5 | 126 | 112 | 112 | NT | 621 | 201 | 0.39 | 10,000+ |
| 8 | 8 | NT | 77 | 84 | 66.5 | 77 | NT | 586 | 57 | 0.08 | 10,000+ |
| 9 | 10 | NT | 77 | 56 | 56 | 56 | NT | 689 | 49 | 0.08 | 10,000+ |
| 10 | 2 | 782.4 | 80.5 | 101.5 | *479.5 | 171.5 | 217 | 689 | 700 | 0.82 | 10,000+ |
| 11 | 2 | 812.8 | 91 | 115.5 | 437.5 | 217 | 231 | 827 | 699 | 1.09 | 10,000+ |
| 12 | 2 | 584 | 115.5 | 192.5 | *605.5 | 273 | 231 | 1393 | 413 | 1.50 | 10,000+ |
| 13 | 2 | 516.8 | 157.5 | 283.5 | *420 | 241.5 | 213.5 | 634 | 491 | 0.82 | |
| 14 | 2 | 651.2 | 171.5 | 231 | *717.5 | 311.5 | 357 | 827 | 612 | 1.41 | 10,000+ |
| 15 | 2 | 651.2 | 171.5 | 259 | *703.5 | *388.5 | 339.5 | 827 | 667 | 1.46 | 10,000+ |
| 16 | 2 | 572.8 | 175 | 234.5 | *595 | *483 | 294 | 552 | 595 | 1.01 | 10,000+ |
| 17 | 1 | 608 | 77 | 101.5 | *577.5 | 164.5 | 262.5 | 4020 | 623 | 1.31 | 10,000+ |
| 18 | 1.6 | 524.8 | 119 | 157.5 | *430.5 | *448 | 189 | 1027 | 513 | 1.63 | 10,000+ |
| 19 | 2 | 715.2 | 73.5 | 101.5 | *507.5 | 308 | 245 | 4254 | 489 | 3.67 | 10,000+ |
| 20 | 2 | 672 | 52.5 | *290.5 | *528.5 | *525 | 185.5 | 1751 | 652 | 2.45 | 10,000+ |
| 21 | 4 | 436.8 | 80.5 | 77 | *203 | 189 | 42 | 586 | 283 | 1.36 | 10,000+ |
| 22 | 2 | NT | 185.5 | 269.5 | *434 | 273 | NT | 552 | 504 | 0.73 | |
| 23 | 2 | NT | 150.5 | 213.5 | *486.5 | 280 | NT | 655 | 583 | 0.10 | 10,000+ |
| 24 | 2 | NT | 154 | 210 | *640.5 | *528.5 | NT | NT | NT | NT | 10,000+ |
| 25 | 2 | NT | 157.5 | 220.5 | *504 | 357 | NT | 620.55 | 490 | 0.08 | 10,000+ |
| 26 | 2 | NT | 178.5 | *469 | *448 | *430.5 | NT | NT | NT | NT | 10,000+ |
| 27 | 2 | NT | 154 | 164.5 | *588 | 241.5 | NT | 620.55 | 618 | 0.83 | 10,000+ |
| 28 | 2 | 620.8 | 154 | 217 | *458.5 | *479.5 | NT | NT | NT | NT | 10,000+ |
| 29 | 2 | 587.2 | 91 | 87.5 | *434 | 112 | NT | NT | NT | NT | 10,000+ |
| 30 | 2 | 624 | 77 | 87.5 | *392 | 112 | NT | NT | NT | NT | 10,000+ |
| 31 | 2 | 624 | 192.5 | 252 | *451.5 | *395.5 | NT | NT | NT | NT | 10,0004 |
| 32 | 2 | 680 | 196 | 238 | *469 | *455 | NT | NT | NT | NT | 10,000+ |
| 33 | 2 | 713.6 | 189 | 248.5 | *500.5 | *430.5 | NT | NT | NT | NT | 10,000+ |
| 34 | 2 | 624 | 210 | 255.5 | *483 | *427 | 262.5 | 400 | 725 | 1.08 | 10,000+ |
| 35 | 2 | 528 | 52.5 | 52.5 | 189 | 52.5 | 140 | 1703 | 193 | 0.82 | 10,000+ |
| 36 | 2 | 432 | 80.5 | 101.5 | 259 | 147 | 133 | 621 | 370 | 0.54 | 10,000+ |
| 37 | 2 | NT | NT | NT | NT | NT | NT | NT | NT | NT | NT |
| 38 | 2 | 400 | 157.5 | *269.5 | *161 | 185.5 | 126 | 496 | 221 | 0.27 | 10,000+ |
| 39 | 2 | 534.4 | 87.5 | 171.5 | *451.5 | 276.5 | 262.5 | 641 | 56 | 1.09 | 10000+ |

*Indicates foam split; NT-sample not tested or data unavailable

TABLE 2

| Example | EMS Pph | Density Kg/m³ | Peak Stress Kpas | Elong % | Overlap Shear Minutes |
|---|---|---|---|---|---|
| 62 | 2 | 590.6 | 634.34 | 1064 | 122 |
| 63 | 4 | 445.9 | 661.92 | 518 | 169 |
| 64 | 6 | 361.5 | 655.025 | 515 | 166 |
| 65 | 8 | 296 | 682.605 | 185 | 129 |
| 66 | 10 | 268.1 | 634.34 | 169 | 113 |
| 67 | 2 | 535.5 | 524.02 | 940 | 122 |
| 68 | 4 | 400.8 | 0 |  | 148 |
| 69 | 6 | 293 | 579.18 | 283 | 117 |
| 70 | 8 | 233.3 | 730.87 | 90 | 83 |
| C1 | 0 | 971.7 | 544.7 | 1867 | 82 |

Example 71

A pressure-sensitive adhesive foam was prepared following the procedure for Example 28 except that 5 pph F100D expandable polymeric microspheres were used with Hot Melt Composition 2 and a hydrocarbon tackifier (Foral™ 85 available from Hercules, Inc. of Wilmington, Del.) was added. The hot melt composition was fed to the extruder at a rate of 2.9 kg/hr and the tackifier was fed to the extruder at a rate of 1.7 kg/hr. The extruder temperatures were set at 93° C., and the hose and die temperatures were set at 177° C. The resulting foam was approximately 0.38 mm thick, and was subsequently crosslinked with an electron beam dose of 8 mrad at an accelerating voltage of 300 Kev. The adhesive foam was laminated to a flexible retroreflective sheeting described in U.S. Pat. No. 5,450,235 (Smith et al), incorporated herein in its entirety by reference.

The retroreflective sheeting with the foamed adhesive was applied at room temperature to a polyethylene barrel (obtained from Traffix Devices, Inc. of San Clemente, Calif.). The barrel was placed in an oven at about 49° C. for 3 days. The barrel was removed from the oven and kept at room temperature for about 24 hours. Then the barrel was placed in a truck at about −1° C. for a week. The sheeting with the adhesive evaluated showed no delamination or buckling from the barrel at the end of the test period.

Other embodiments are within the following claims.

What is claimed is:

1. A method for preparing an article, said method comprising:
   (a) melt mixing a substantially solvent-free polymer composition having a less than 20 wt. % solvent content and a plurality of microspheres, at least one of which is an expandable polymeric microsphere, under process conditions, including temperature and shear rate, selected to form an expandable extrudable composition;
   (b) extruding the expandable extrudable composition through a die to form a foam; and
   (c) at least partially expanding one or more expandable polymeric microspheres before the expandable extrudable composition exits the die.

2. A method according to claim 1 wherein the article is an adhesive article.

3. A method according to claim 1 wherein the article is a pressure sensitive adhesive article.

4. A method according to claim 1 wherein the article is a heat-activated adhesive article.

5. A method according to claim 1 wherein the polymer foam is an adhesive.

6. A method according to claim 1 wherein the foam itself in its as extruded condition comprises a pair of major surfaces, at least one of which is substantially smooth with an Ra value less than about 75 micrometers, as measured by laser triangulation profilometry.

7. An article according to claim 6 wherein both of the major surfaces are substantially smooth with an Ra value less than about 75 micrometers, as measured by laser triangulation profilometry.

8. A method according to claim 1 wherein the expandable extrudable composition further comprises a chemical blowing agent.

9. A method according to claim 1 wherein the expandable extrudable composition comprises a plurality of expandable polymeric microspheres.

10. A method according to claim 1 wherein the expandable extrudable composition comprises a non-expandable microsphere.

11. A method according to claim 1 further comprising crosslinking the polymer foam.

12. A method according to claim 1 further comprising exposing the polymer foam to thermal, actinic, or ionizing radiation subsequent to extrusion to crosslink the polymer foam.

13. A method according to claim 1 comprising co-extruding the expandable extrudable composition with a second extrudable polymer composition.

14. A method according to claim 13 wherein the second extrudable polymer composition comprises an adhesive polymer composition.

15. A method according to claim 1 comprising co-extruding the expandable extrudable composition with a plurality of extrudable polymer compositions.

16. A method according to claim 15 wherein at least one of the extrudable polymer compositions comprises an adhesive polymer composition.

17. A method according to claim 1 wherein the at least one expandable polymeric microsphere is a plurality of expandable polymeric microspheres.

18. A method according to claim 1 further comprising heating the article after the expandable extrudable composition exits the die to cause further expansion of the one or more expandable polymeric microspheres.

19. A method according to claim 1 wherein the article includes an adhesive article made with the foam and two opposing substrates that form a recess therebetween, said method further comprising disposing the adhesive article in the recess between the two opposing substrates and heating the adhesive article to cause enough expansion of the foam to fill the recess and bond the two substrates together.

20. A method according to claim 1 further comprising selectively heating the foam after exiting the die so as to form a patterned foam having areas of different densities.

21. A method according to claim 1 wherein the foam itself, formed during said extruding step, has at least one surface which is substantially smooth, with an Ra value less than about 75 micrometers, as measured by laser triangulation profilometry, upon exiting the die without the need for any secondary smoothing operations.

22. A method according to claim 1 wherein said step of melt mixing includes mixing the polymer composition with a plurality of expandable polymeric microspheres and said step of at least partially expanding includes at least partially expanding a plurality of the expandable polymeric microspheres after said melt mixing step and before the expandable extrudable composition exits the die.

23. A method according to claim 1 wherein said step of melt mixing includes mixing the polymer composition with a plurality of expandable polymeric microspheres and said step of at least partially expanding includes expanding the plurality of expandable polymeric microspheres inside the die before the expandable extrudable composition exits the die.

24. A method according to claim 1 wherein the polymer composition being melt mixed is substantially solvent-free, with no greater than about 10 wt. % solvent.

25. A method according to claim 1 wherein the polymer composition being melt mixed is substantially solvent-free, with no greater than about 5 wt. % solvent.

26. A method according to claim 1 wherein the foam in its as extruded condition has a surface with a surface roughness value, Ra, of less than about 75 micrometers, as calculated using the following relationship:

$$R_a = \frac{1}{L_m} \int_0^{L_m} |z(x)| dx$$

where $R_a$ is the surface roughness, $L_m$ is the total displacement length, and z is the height at a displacement of x.

27. A method according to claim 1 wherein the polymer composition has a viscosity, measured at a temperature of 175° C. and a shear rate of 100 sec$^{-1}$, of at least 30 Pa-s.

28. A method according to claim 1 wherein the polymer composition has a viscosity, measured at a temperature of 175° C. and a shear rate of 100 sec$^{-1}$, of at least 100 Pa-s.

29. A method according to claim 1 wherein the polymer composition has a viscosity, measured at a temperature of 175° C. and a shear rate of 100 sec$^{-1}$, of at least 200 Pa-s.

30. A method according to claim 1 wherein the at least one expandable microsphere is a plurality of expandable polymeric microspheres and the foam has a substantially homogeneous distribution of the expandable polymeric microspheres.

31. A method according to claim 1 wherein the at least one expandable microsphere is a plurality of expandable polymeric microspheres, the foam has a center, said step of expanding expands the expandable polymeric microspheres to form expanded polymeric microspheres, and the foam has a uniform size distribution of the expanded polymeric microspheres from the surface to the center of the foam.

32. A method according to claim 1 wherein during said step of at least partially expanding, the one or more expandable polymeric microspheres are permanently expanded before the expandable extrudable composition exits the die.

33. A method according to claim 1 further comprising co-extruding at least one polymer layer with the foam, wherein the foam is in the form of a plurality of discrete foam structures arranged in a pattern and combined within the at least one co-extruded polymer layer, with the density of the discrete foam structures being different from the density of the at least one co-extruded polymer layer surrounding the discrete foam structures.

34. A method according to claim 1 further comprising co-extruding the expandable extrudable composition with at least one other extrudable polymer composition, wherein the at least one other extrudable polymer composition is at least one from the group consisting of a polymer composition having a higher modulus than the expandable extrudable composition for stiffening the foam, a polymer composition having a lower modulus than the expandable extrudable composition for increasing the flexibility of the foam, and an additional foam composition.

35. A method for preparing an article, said method comprising:

(a) melt mixing a substantially solvent-free polymer composition and a plurality of expandable polymeric microspheres, under process conditions, including temperature and shear rate, selected so as to cause the expandable polymeric microspheres to break during said mixing step and to form an expandable extrudable composition;

(b) extruding the expandable extrudable composition through a die to form a foam; and (c) processing the expandable extrudable composition so as to at least partially and permanently expand a plurality of the expandable polymeric microspheres after said melt mixing step and before the expandable extrudable composition exits the die.

36. A method according to claim 35 wherein the foam itself, formed by said extruding step, has two major surfaces, at least one of which is substantially smooth, with an Ra value less than about 75 micrometers, as measured by laser triangulation profilometry, upon exiting the die without the need for any secondary smoothing operations.

37. A method according to claim 35 wherein the article is an adhesive article and said method includes laminating an adhesive layer onto a surface of the foam.

38. A method according to claim 35 wherein said step of melt mixing is performed under process conditions, including temperature and shear rate, selected so as not to cause the expandable polymeric microspheres to expand or break during said mixing step.

39. A method according to claim 35 wherein the polymer composition being melt mixed is substantially solvent-free, with no greater than about 10 wt. % solvent.

40. A method according to claim 35 wherein the polymer composition being melt mixed is substantially solvent-free, with no greater than about 5 wt. % solvent.

41. A method according to claim 35 wherein the polymer composition has a viscosity, measured at a temperature of 175° C. and a shear rate of 100 sec$^{-1}$, of at least 30 Pa-s.

42. A method according to claim 35 wherein the polymer composition has a viscosity, measured at a temperature of 175° C. and a shear rate of 100 sec$^{-1}$, of at least 100 Pa-s.

43. A method according to claim 35 wherein the polymer composition has a viscosity, measured at a temperature of 175° C. and a shear rate of 100 sec$^{-1}$, of at least 200 Pa-s.

44. A method according to claim 43 further comprising bonding another polymer layer to a face of the at least one co-extruded polymer layer.

45. A method according to claim 43 wherein the at least one co-extruded polymer layer is a plurality of polymer layers.

* * * * *

UNITED STATES PATENT AND TRADEMARK OFFICE
CERTIFICATE OF CORRECTION

PATENT NO. : 6,103,152
DATED : August 15, 2000
INVENTOR(S) : Mark D. Gehlsen et al.

It is certified that error appears in the above-identified patent and that said Letters Patent is hereby corrected as shown below:

<u>Column 5,</u>
Line 56, "processor" should read -- process --.

Signed and Sealed this

Sixteenth Day of October, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,103,152  
APPLICATION NO. : 09/127774  
DATED : August 15, 2000  
INVENTOR(S) : Mark David Gehlsen Page 1 of 1

It is certified that error appears in the above-identified patent and that said Letters Patent is hereby corrected as shown below:

In the Claims

Column 26
In Claim 35, line 12, delete "expandable polymeric microspheres to break during" and insert in place thereof -- expandable polymeric microspheres to not break during --

Signed and Sealed this
Thirtieth Day of July, 2013

Teresa Stanek Rea
*Acting Director of the United States Patent and Trademark Office*